United States Patent
Vohra

(10) Patent No.: US 6,744,986 B1
(45) Date of Patent: Jun. 1, 2004

(54) TUNABLE WAVELENGTH ADD/DROP MULTIPLEXER BASED ON INTEGRATED OPTIC DEVICES

(75) Inventor: Sandeep T. Vohra, Fairfax Station, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/609,116

(22) Filed: Jun. 30, 2000

(51) Int. Cl.[7] .............................. H04J 14/02
(52) U.S. Cl. .............................. 398/83; 398/49
(58) Field of Search ..................... 359/130, 128, 359/127, 124; 385/37; 398/82, 83, 84, 85, 49

(56) References Cited

U.S. PATENT DOCUMENTS

| | | | | |
|---|---|---|---|---|
| 4,820,009 A | * | 4/1989 | Thaniyavarn | 385/2 |
| 5,623,568 A | * | 4/1997 | Khan et al. | 385/131 |
| 5,757,536 A | * | 5/1998 | Ricco et al. | 359/224 |
| 5,778,118 A | * | 7/1998 | Sridhar | 385/24 |
| 5,790,287 A | * | 8/1998 | Darcie et al. | 398/108 |
| 5,818,585 A | | 10/1998 | Davis et al. | 356/345 |
| 5,892,582 A | | 4/1999 | Bao et al. | 356/345 |
| 6,266,460 B1 | * | 7/2001 | Doerr | 385/16 |
| 6,269,202 B1 | * | 7/2001 | Lee et al. | 385/24 |

* cited by examiner

Primary Examiner—Jason Chan
Assistant Examiner—Christina Y Leung
(74) Attorney, Agent, or Firm—John J. Karasek; John Gladstone Mills, III

(57) ABSTRACT

A tunable wavelength add/drop (t-WDM) device utilizes a multiwavelength input (which serves as a data input port), a low loss optical circulator or an optical coupler, a wavelength division de-multiplexer which splits the input multi-wavelength data stream into itsd individual components, a modified multi-channel DOS, a telecommunications grade optical fiber, and a wavelength multiplexer for adding optical data channels. The input multi-wavelength data stream from a network is sent to a wavelength de-multiplexer where it is demultiplexed into individual wavelengths which are applied to an array of Y-branch digital optical switching devices controlled by a computer. If a specific wavelength is to be dropped, it is diverted towards a branch of a given switch which has a fiber pig tail attached. If a specific wavelength is to be sent through (neither dropped or added) then the signal is diverted towards a mirrored end of the Y-branch, where it is reflected back towards the wavelength de-multiplexers to the circulator and goes out the output end of the t-WADM. If a wavelength 'slot' has ben vacated by a dropping channel then a new data stream may be added in that slot.

5 Claims, 6 Drawing Sheets

TUNABLE WAVELENGTH ADD/DROP MULTIPLEXER BASED ON INTEGRATED OPTIC DEVICES

BACKGROUND OF THE INVENTION

1. Field of the Invention

Generally, this invention pertains to an optical wavelength add/drop multiplexing unit and more specifically to a tunable optical wavelength add/drop multiplexing unit for both digital and analog applications.

2. Description of the Related Prior Art

Last decade has seen an explosion in applications involving fiber optic technology. Fiber optic systems have primarily been used to develop very high information capacity transmission systems. The information capacity or 'capacity' of an optical communication link has doubled every year during the past half decade or so. The technology has reached a state of maturity where large systems manufacturers are routinely deploying wavelength division multiplexed (WDM) systems with total capacity exceeding 400 Gigabits/second on a single optical fiber. Such high capacity transmission systems are playing a critical role in revolutionizing today's society, from e-commerce to e-mail and from voice-over-IP to plain old voice. The advent of WDM systems and the component used in WDM systems have also positive benefits in other areas including analog transmission systems like microwave photonic systems and fiber optic sensor systems, both of great importance in numerous applications for governmental as well as the commercial market.

Almost all of the WDM based optical communications systems deployed so far can be classified as optical transport systems or more commonly known as point-to-point communications systems. In such systems, relevant information (e.g., internet data traffic) is electronically multiplexed to a high bit rate. The multiplexed electrical information is then imposed upon an optical amplitude modulator and transported via optical fiber from point A to B (as shown in FIG. 1). If this process is repeated at several wavelengths then the optical transport system is referred to as a WDM system. This approach has become "the standard" approach for high bit rate optical transport systems. The invention of optical amplifiers (e.g., erbium doped fiber amplifiers) have greatly enhanced the practicality and elegance of WDM systems and is primarily responsible for accelerating the rate of deployment of WDM systems and also the number of multi-millionaires in the country. Such point-to-point optical transport systems are considered 'present' generation systems and are commercially available from various well known corporations like Lucent Technologies, Nortel Networks, Cisco Systems and Ciena.

The next generation of optical communications systems are expected to provide significantly greater functionality than just transport of optical signals from point A to point B. Optical transport systems are expected to evolve into true optical networks. Optical networks will allow routing and reconfiguration of traffic in the optical domain. In present generation optical transport systems routing of data is done primarily in the electrical domain. In other words, the optical signals are converted from optical to electrical domain at their destination and are then electrically manipulated such that certain traffic is dropped while new traffic is added. That is the main reason why high speed electrical routers are in great demand. In future optical communication systems the manipulation and routing of optical channels is expected to occur in the optical domain. Naturally, at some point within the network, optical signals will have to be converted into electrical signals but that conversion will take place towards the 'edge' of a given network rather than at the 'core' of the network. This is expected to greatly enhance network speed, allow for dynamic reconfigurability, and enhanced reliability. The cost per bit is also expected to drop due to the deployment of an optical layer. In order to achieve a true all-optical layer within a data network, devices which allow adding and dropping data channels in the optical domain will be essential. In order to facilitate dropping and adding wavelengths in WDM optical networks, there will be tremendous demand for wavelength agile products. Wavelength agile products are products which allow you to manipulate optical signals without converting them into the electrical domain, Such products are sometimes also referred to as wavelength management products.

One of the products that will be in high demand will be a tunable wavelength add/drop multiplexers (t-WADM). Fixed wavelength add/drop multiplexers are already becoming commercial but these products require that the wavelengths to be dropped at a specific site (commonly known as a node) be known ahead of time. Fixed notch filter, typically made from fiber Bragg gratings, are utilized to make such fixed wavelength add/drop multiplexers. However, optical networks of the future require that a node be established within the network where any or all wavelengths can be dropped on demand. In other words, the number of wavelengths to be dropped or added in an optical network will be a dynamic parameter which will depend on local traffic demands and changing customer needs. Programmable or tunable all-optical wavelength add/drop devices will become crucial in such networks. In short, the need for dynamic reconfigurablity at the optical level in a WDM transport network will require programmable or tunable wavelength add/drop multiplexers (t-WADM) at numerous locations in the network.

The t-WADM also can be used in applications not involving optical communication. For instance, optical fiber systems are seeing a lot of use in defense related microwave photonics applications. Optically controlled phase array radars are now being deployed on a trial basdis in the Navy. Such optically controlled phased array radars also exploit the WDM technology primarily-developed for optical communication systems but extremely beneficial in more defense related applications. The t-WADM products can also be used in high count fiber sensor systems typically used for advanced underwater applications like acoustic arrays, Fiber optic acoustic arrays are now scheduled for fleet insertion. Acoustic arrays are also being used for developing advanced underwater acoustic surveillance arrays. These arrays already utilize WDM architecture and the t-WADM can potentially be utilized in fiber sensor systems.

SUMMARY OF THE INVENTION

The object of this invention is to provide an optical system which allows dropping and adding of optical data channels in wavelength agile optical communications networks.

This and other objectives of this invention are achieved by a tunable wavelength add/drop (t-WADM) device utilizing an integrated optic digital switch (DOS) which is an integrated optic on/off switch with high extinction ratio and a digital response curve. The t-WADM is comprised of a multiwavelength input (which serves as a data input port), a low loss optical circulator or an optical coupler, a wavelength division de-multiplexer which splits the input multi-wavelength data stream into its individual components, a modified multi-channel DOS, a telecommunications grade optical fiber, and a wavelength multiplexer for adding optical data channels. The input multi-wavelength data stream from a network is sent to a wavelength demultiplexer where it is demultiplexed into individual wavelengths which are applied to an array of Y-branch digital optical switching devices controlled by a computer. If a specific wavelength is to be dropped, it is diverted towards a branch of a given switch which has a fiber pig tail attached. If a specific wavelength is to be sent through (neither dropped or added) then the signal is diverted towards a mirrored end of the Y-branch, where it is reflected back towards the wavelength de-multiplexers to the circulator and goes out the output end of the t-WADM. If a wavelength 'slot' has ben vacated by dropping a channel then a new data stream may be added in that slot.

DESCRIPTION OF THE PREFERRED EMBODIMENT

Figure 1:
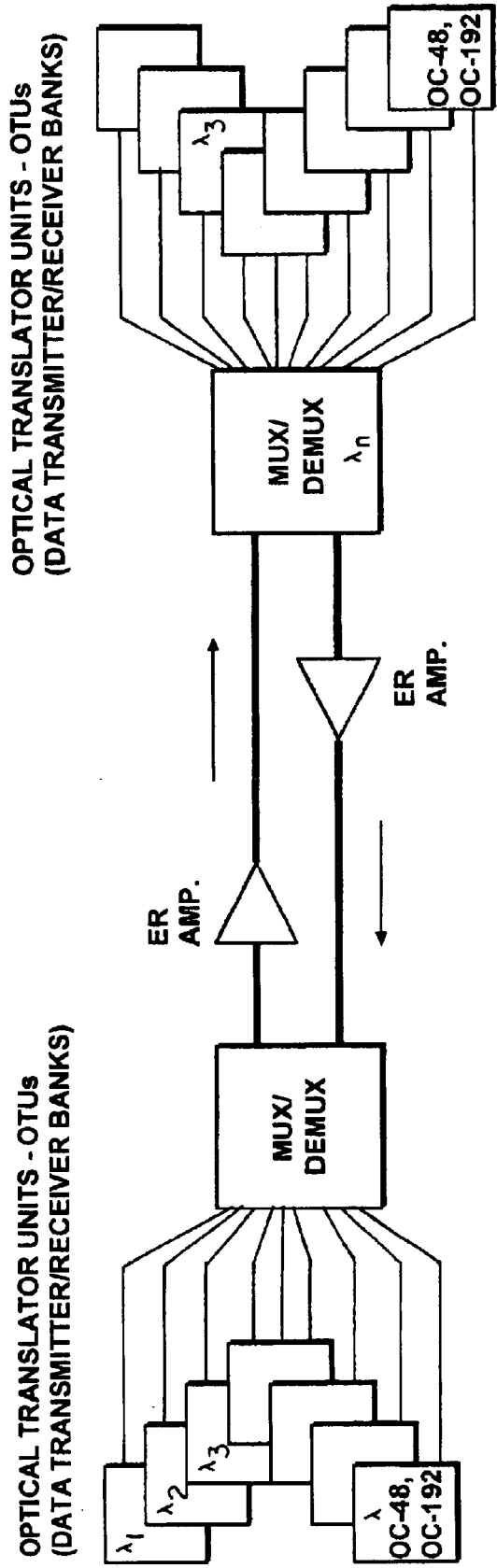
FIG. 1 shows a conventional WDM point-to-point optical communication system.
Figure 2:
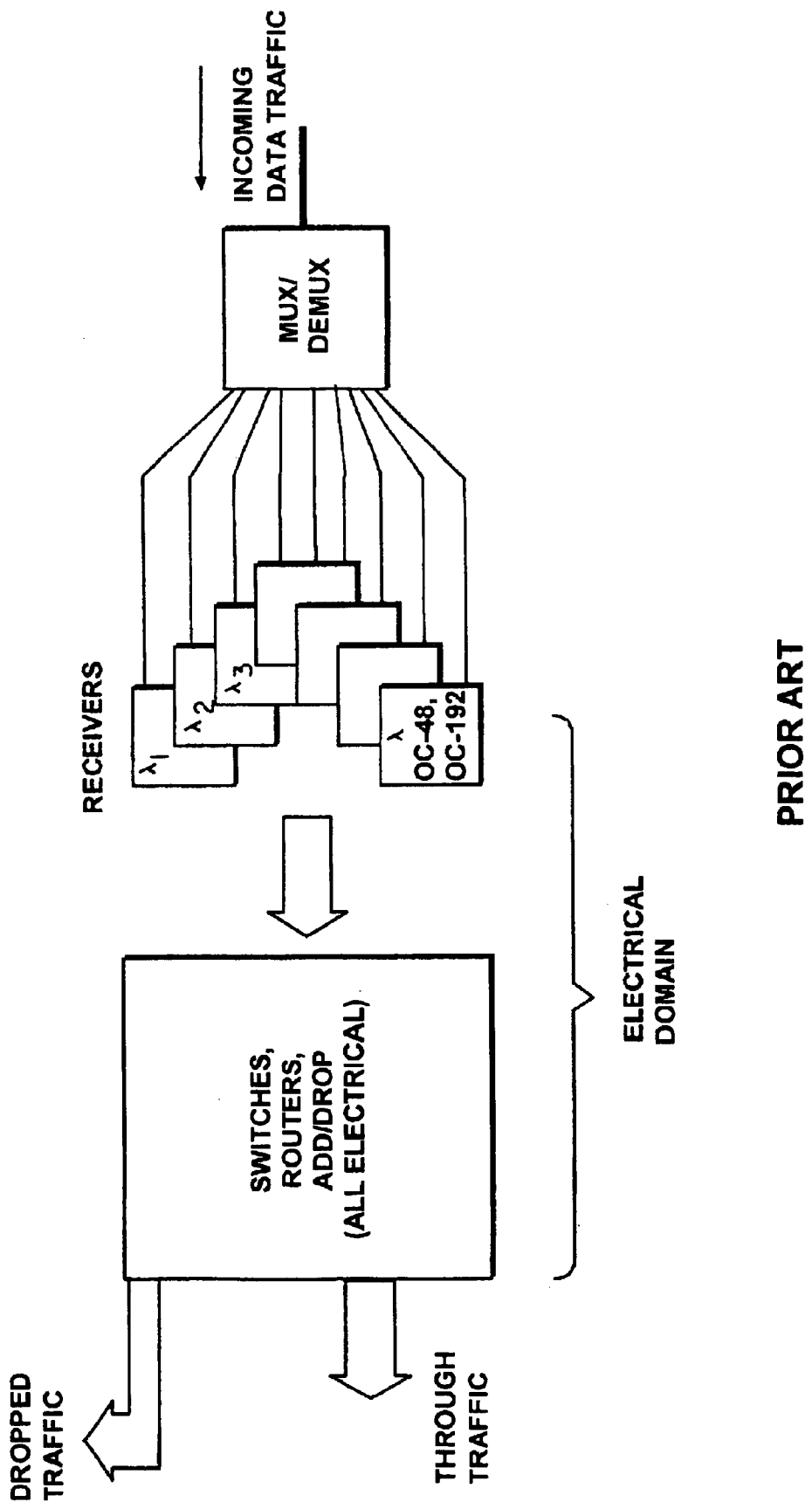
FIG. 2 shows a typical switching and routing instruments at the receive end of a communications link in the prior art.
Figure 3A:
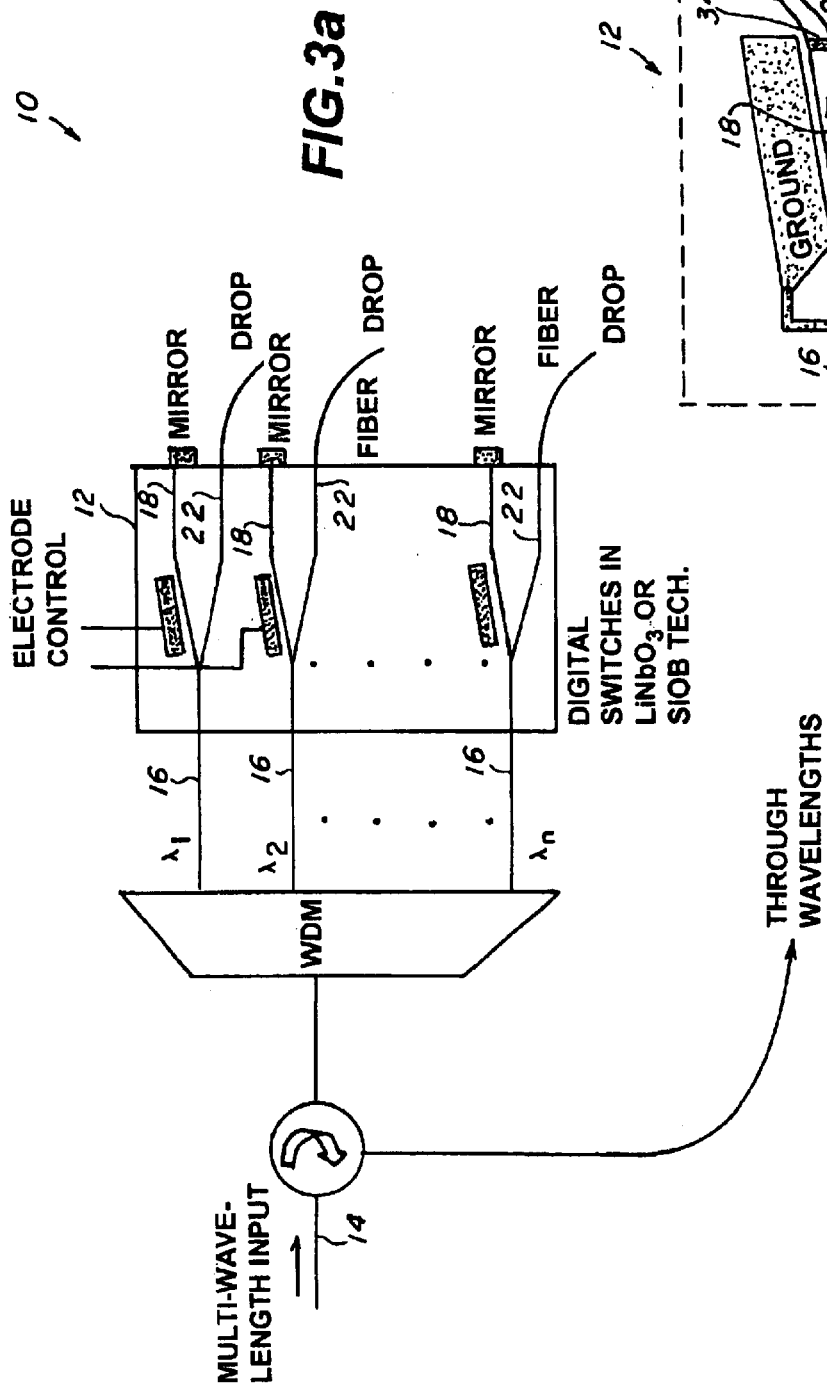
FIG. 3a shows a schematic of an integrated optic base tunable optical add/drop multiplexer unit using a modified Y-branch digital optical switch.
Figure 3B:
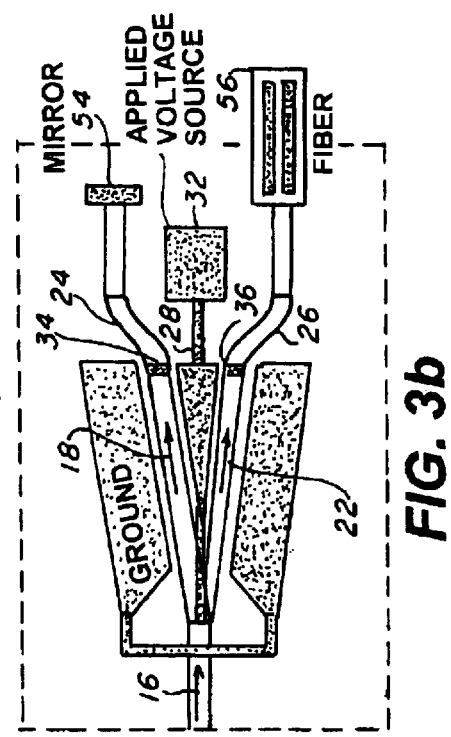
FIG. 3b shows a schematic of a modified Y-branch digital optical switch.
Figure 3C:
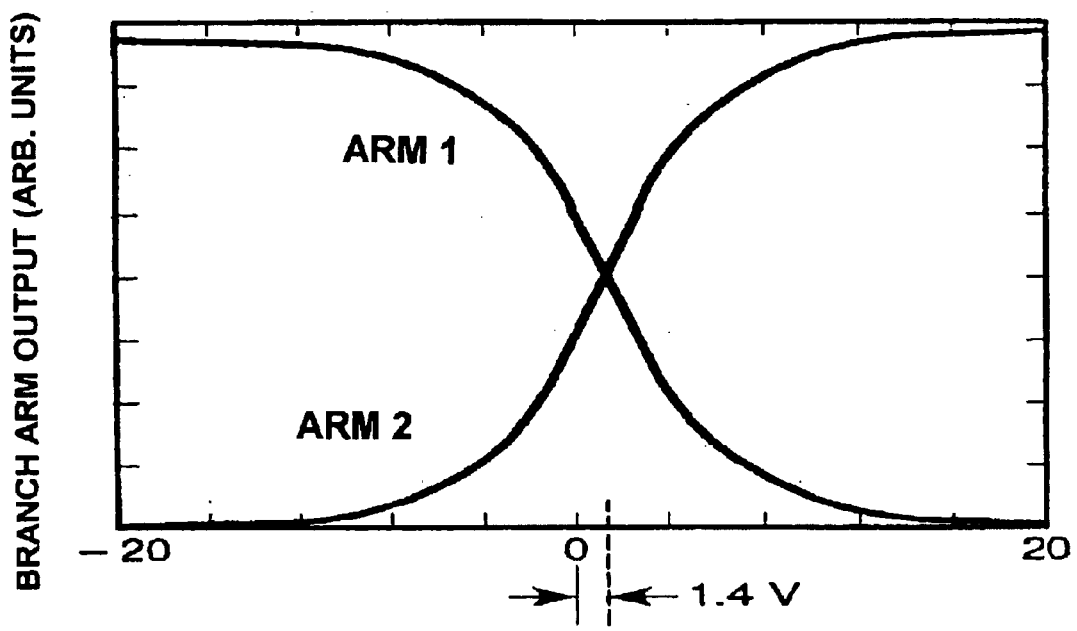
FIG. 3c shows a typical transfer curve of a digital optical switch.

A tunable wavelength add/drop multiplexer (t-WADM) device 10, as shown in FIG. 3a, is based on a digital optical switch (DOS) 12, as shown in FIG. 3b. A DOS 12 is essentially an integrated optic on/off switch with extremely high extinction ratio and a digital response curve. The basic premise of the DOS 12 is that it is a Y-branch optical waveguide created in a material which supports waveguiding at communications wavelengths. The coupling of optical modes in such a waveguide configuration is such that one wavelength 16 of a multiple-wavelength optical light 14 is split equally (18 and 22), i.e., 50:50, among the two output ports 24 and 26. The DOS 12 is created using an electro-optically active materials, such as lithium niobate ($LiNbO_3$) or similar materials, or a thermo-optically active material, such as silicon, then an appropriate voltage 28 from a applied voltage source 32 with the aid of electrodes 34 and 36, in order to alter the 50:50 balance and subsequently allow all of the light 16 to exit one or the other ports 24 and 26 of the DOS 12. It essentially functions as a digital 1×2 optical switch with extremely high extinction ratio (>50dB). A transfer curve of a typical DOS 12 is shown in FIG. 3c.

Figure 4:
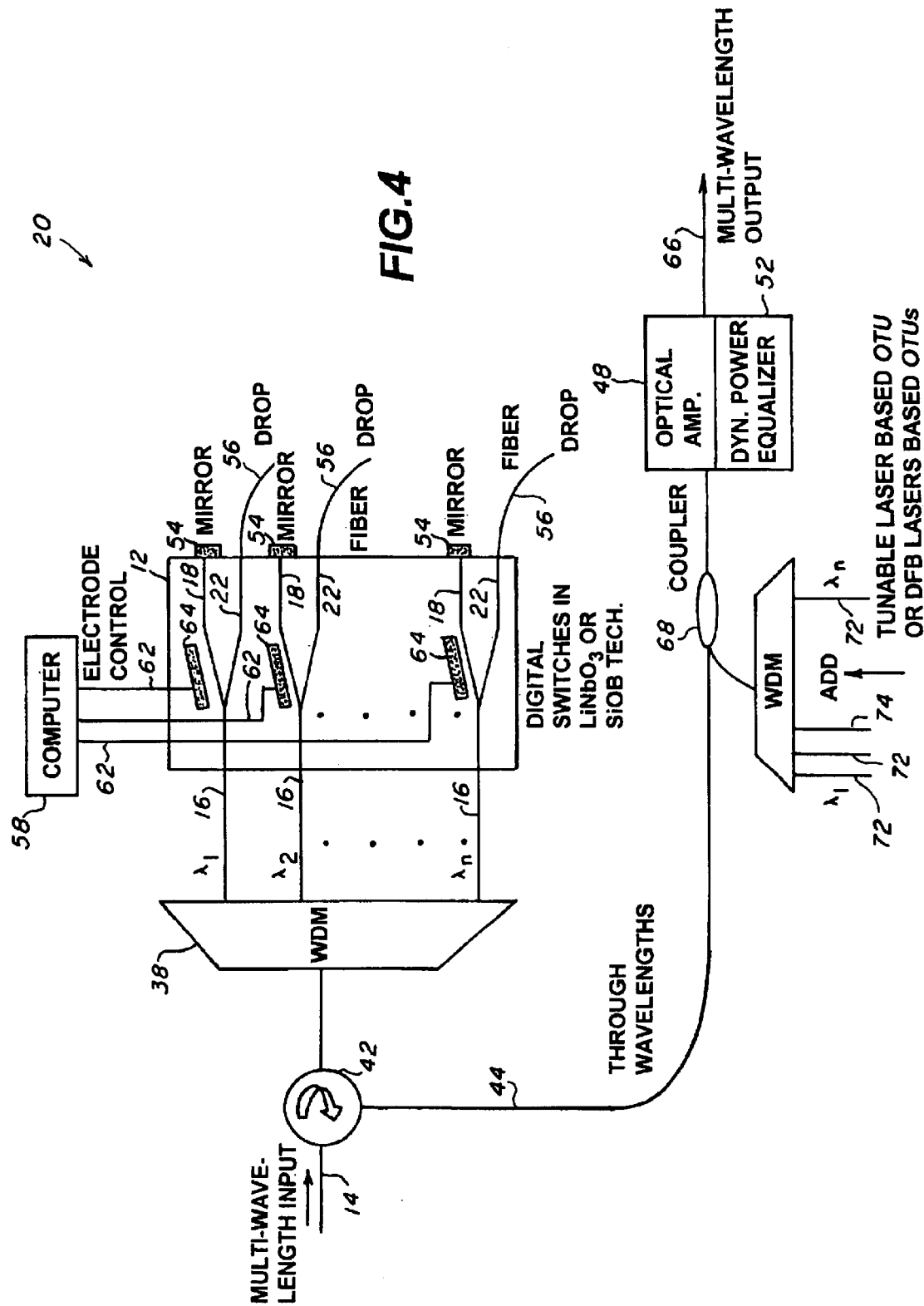
FIG. 4 shows a schematic of an integrated optic based tunable optical add/drop multiplexer unit using a modified Y-branch digital optical switch with adding functionality shown.

A first preferred embodiment of a DOS based tunable wavelength add/drop multiplexer (t-WADM) device 10, as shown in FIG. 4. The t-WADM 20 consists of an input of a multiwavelength optical data stream 14, a low loss optical circulator or an optical coupler 42, a wavelength divisions de-multiplexer 38 which splits the input multi-wavelength data stream 14 into its individual wavelength components, $\lambda_1, \lambda_2, \ldots, \lambda_n$, 16 a modified multi-channel Y-branch DOS 12, telecommunications grade optical fiber 44, and a wavelength multiplexer 46 for adding optical channels. Optical amplifiers 48 and power equalizers 52 are shown for completeness but may or may not be included depending on system 10 requirements.

The Y-branch DOS 12 is configured such that one of the two outputs 18 has a mirror 54 at the end of the waveguides 18 while the other waveguide 22 has an optical fiber pig tail 56 (see FIG. 3b for detail). Depending on the voltage 28 from the applied voltage source 32 applied to the electrodes 34 and 36 all of the light 16 can be diverted into the waveguide 18 with the mirrored end 54 or it can be sent to the waveguide 22 with the fiber pig tail 56. The voltage levels required on the electrodes 34 and 36 to obtain such functionality are modest, between 5 and 15 volts. If the switch 12 is configured such that all the light 16 is sent to the mirrored side of the Y-branch 18, then the light 16 will reflect back from the mirror 54 and will be sent back along the same path as it arrived from. If the light is sent to the branch 22 of the waveguide 16 containing the fiber pig tail 56, then it will couple into the fiber. This describes the operation of a single Y-branch digital optical switch 12 with one mirrored end 54 and one fiber pig tailed 56 end. This device is referred to as a modified DOS 12. In the utilization of the mirrored DOS 12, one such modified Y-branch DOS 12 is required for every wavelength 16. Arrays of Y-branch DOS 12 can be made on a single electro-optically active switch or can be made as individual switches and packaged as a unit.

The input multi-wavelength data stream 14 from the network is sent to a wavelength de-multiplexer, such as a 16 channel DWD manufactured by E-TEK of San Jose, Calif., where it is demultiplexed into individual wavelengths 16. The individual wavelengths 16 are sent into an array of modified Y-branch digital optical switching devices 12 fabricated monolithically or individually on a electro-optically active substrate (e.g., $LiNbO_3$) or a thermo-optically active substrate material. The modified DOS 12 is controlled with a computer 58 which imposes programmable voltage signals 62 onto the DOS electrodes 64. If a specific wavelength 16 is to be dropped, then it diverts that particular wavelength 16 towards the branch of the switch 22 which has a fiber pig tail 56 attached to it. On the other hand, if a specific wavelength 16 is to be sent through (i.e., neither dropped or added) then it diverts the signal towards the mirrored end of the switch 18, where it reflects back towards the wavelength demultiplexers 38 to the circulator 42 and goes out to the output end of the t-WADM 66. Such channels are referred to as 'through' channels.

If a wavelength 'slot' has been vacated by dropping a channel then it is likely that a new set of data stream might be added in that slot. This operation is accomplished by inserting an optical coupler 68 as part of the through channel fiber 44. A wavelength multiplexer 46 is used to add channels 72 in vacated wavelength slots (dropped data traffic). This may be followed by optical amplification 48 and power equalizing 52, as previously noted, which then completes the drop/add operation by transmitting the wavelength multiplexed add/drop signal through the output of the t-WADM device 66.

The entire operation is computer 58 controlled in terms of providing commands 62 to the relevant electrodes 64 on the Y-branch digital optical switches 12 for channel adding and dropping, as needed. The whole process may be performed remotely by sending commands to the control computer 58. As can be anticipated, this approach has many benefits in data traffic routing in global optical communications systems. This sub-system also has wide applications in WDM based photonics systems and networks fiber sensor arrays.

Figure 5:
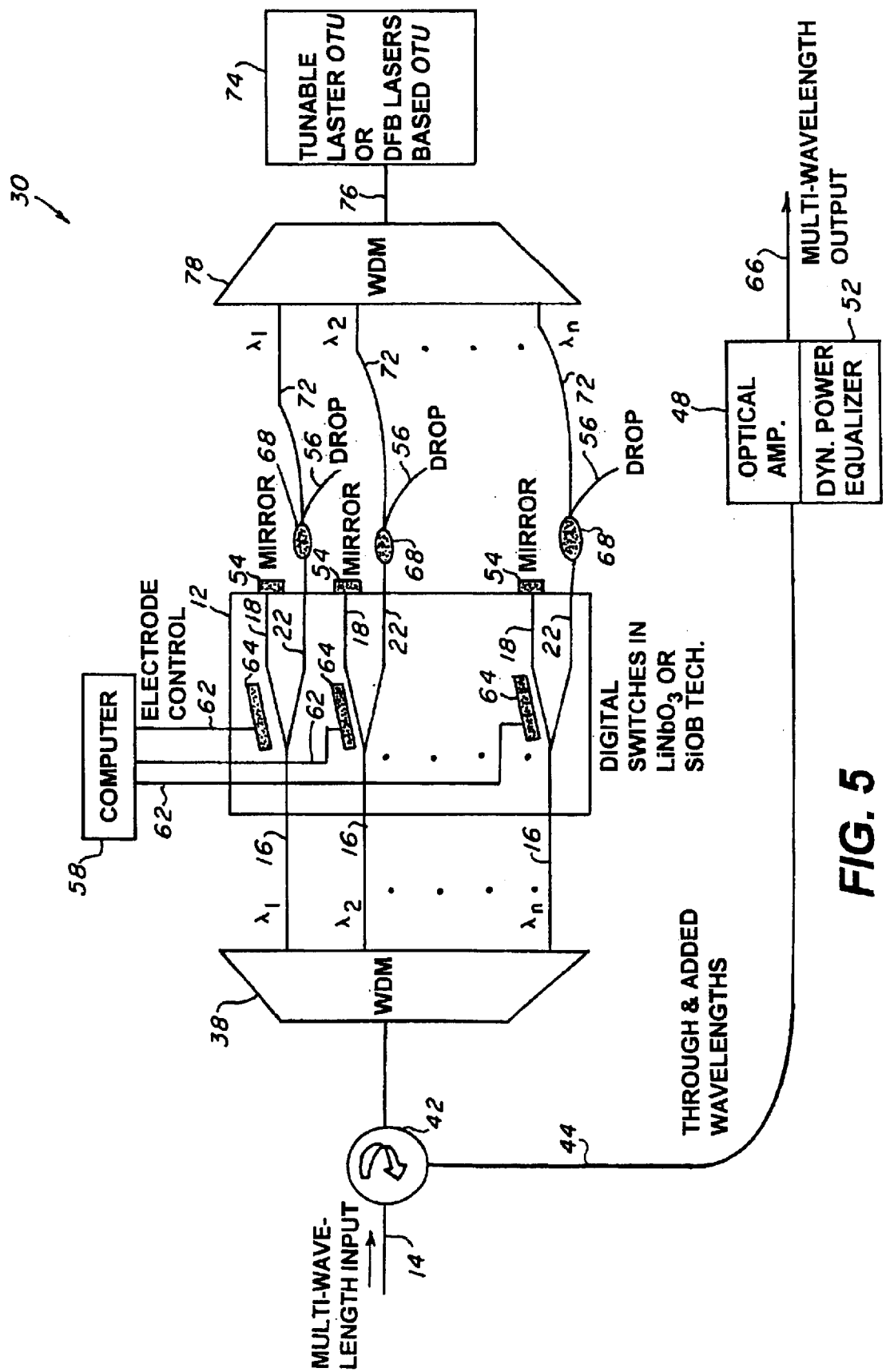
FIG. 5 shows a second embodiment with channel adding capability through the digital optical switch.

A third embodiment of a DOS based tunable wavelength add/drop multiplexer (t-WADM) device 30, is shown in FIG. 5. This embodiment 30 uses an integrated optic Y-branch digital optical switches 12 as described for the first embodiment 20. It is similar to the approach described above in terms of dropping wavelengths 16 or sending wavelengths through but it differs in terms of adding wavelengths. Wherein the first embodiment 20, added wavelengths were not being sent through the Y-branch DOS 12 array. In this embodiment 30, an optical transmitter 76, such as a tunable laser Lucent C489 or a bank of ITU grid DFB lasers, is de-multiplexed in a WDM 78 to produce individual optical signals 72 which are applied through an associated optical coupler 68 for every channel through which wavelengths 72 are added. For practical purposes or for the purpose of making a more integrated (i.e., space savings) system, this approach may be preferred in certain circumstances.

The embodiments taught here allow for many advantages and new features sought by the optical telecommunication industry including: (1) it allows dropping and adding any or all wavelengths at the optical level which allows for the flexibility in data trafficing that is needed in advanced communications systems, (2) Y-branch DOS does not possess a DC bias drift as does Mach-Zehnder based optical switching elements, this generally simplifies things for systems applications, (3) monolithic integration of switches, (4) fast switching times (nano-seconds possible), (5) flat bandpass filter response, (6) proven fabrication technology. (Si and $LiNbO_3$) and (7) no dispersion in switching elements (i.e., DOS), thus allowing cascadability, and (8) bit rate and format independent operation.

It should be noted that choice of material to be used for the switching elements (i.e., Y-branch DOS) can be rather large, even though silicon or $LiNbO_3$ waveguide technology would be the obvious choice. Silicon does not allow for fast switching times and relies on thermo-optic switching but may prove to be more cost effective, while $LiNbO_3$ based Y-branch DOS allows for extremely fast switching times. Other materials (e.g., polymer Y-branch DOS) may also be used for fabricating the switching elements.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. A multiplexer for adding or dropping data from a data bit stream comprising:

a wavelength division de-multiplexer for receiving a multi-wavelength data stream from a network and for separating said multi-wavelength data stream into individual wavelengths;

a circulator for controlling direction of the multi-wavelength data stream;

an array of Y-branch digital optical switching devices operative to receive the individual wavelengths, each switch of the array of Y-branch digital optical switching devices being selectable to pass or drop an individual component of the individual wavelengths, wherein said individual components are dropped through associated optical couplers;

a multiplexer for adding optical data channels to replace those dropped individual wavelengths to form a reconstructed data bit stream;

an optical transmitter connected to said multiplexer and consisting of a tunable laser which is de-multiplexed to produce individual optical signals which are applied through one of said associated optical couplers for every channel through which wavelengths are added;

an optical fiber transmission line for transmitting the reconstructed data bit stream; and a computer controlling the directing of the input multi-wavelength data stream from the network to the wavelength de-multiplexer where it is demultiplexed into individual wavelengths which are applied to the array of Y-branch digital optical switching devices.

2. The multiplexer, as in claim 1, wherein the Y-branch multi-channel digital optical switch further comprises:

a mirror; and a optical fiber pig tail.

3. A method of adding or dropping data from a data bit stream comprising:

obtaining a multi-wavelength data stream from a network;

separating the multi-wavelength data stream into individual wavelength components;

determining at least one dropped individual wavelength component and at least one sent individual wavelength component of the individual wavelength components;

configuring at least one switch of an array of voltage selectable switches to drop at least one dropped individual wavelength component;

selectively dropping the at least one dropped individual wavelength component using the at least one switch, wherein said at least one dropped individual wavelength component is dropped through at least one of a plurality of associated optical couplers;

selectively sending the at least one sent individual wavelength component using the plurality of switches;

using a tunable laser which is de-multiplexed to produce individual optical signals to add optical data wavelength components through said associated optical couplers to the at least one sent individual wavelength component to form a reconstructed data bit stream;

controlling the array of voltage selectable switches by applying a voltage level to each switch of the array of voltage selectable switches, where the voltage level is selected from a group of voltage levels comprising a pass voltage level and a drop voltage level; and transmitting the reconstructed data bit stream.

4. The method of claim 3, wherein the at least one switch is configured by applying a voltage level to the at least one switch.

5. The device of claim 3, wherein the pass voltage level is about 5 to 15 volts.

* * * * *